(12) United States Patent
Bunker et al.

(10) Patent No.: US 9,263,093 B2
(45) Date of Patent: Feb. 16, 2016

(54) DRIVE CARRIER LIGHT SOURCE CONTROL

(75) Inventors: M. Scott Bunker, Tomball, TX (US); Michael White, Houston, TX (US); Timothy A Mccree, Spring, TX (US); Keith J Kuehn, Magnolia, TX (US); Andrew James Phelan, Magnolia, TX (US); John P Franz, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/235,572

(22) PCT Filed: Oct. 25, 2011

(86) PCT No.: PCT/US2011/057599
§ 371 (c)(1),
(2), (4) Date: Jan. 28, 2014

(87) PCT Pub. No.: WO2013/062521
PCT Pub. Date: May 2, 2013

(65) Prior Publication Data
US 2014/0169145 A1    Jun. 19, 2014

(51) Int. Cl.
*G11B 11/00* (2006.01)
*G11B 33/10* (2006.01)
*G11B 11/105* (2006.01)
*G11B 3/12* (2006.01)
*G11B 7/09* (2006.01)

(52) U.S. Cl.
CPC ............... *G11B 33/10* (2013.01); *G11B 3/125* (2013.01); *G11B 7/0945* (2013.01); *G11B 11/10595* (2013.01)

(58) Field of Classification Search
None
See application file for complete search history.

(56) References Cited

U.S. PATENT DOCUMENTS

| 6,185,103 | B1 | 2/2001 | Yamada |
|---|---|---|---|
| 1,235,216 | A1 | 8/2002 | Chang |
| 6,443,768 | B1 | 9/2002 | Dirkers et al. |
| 6,460,948 | B2 | 10/2002 | Roesner et al. |
| 6,560,099 | B1 | 5/2003 | Chang |
| 6,567,360 | B1 * | 5/2003 | Kagawa ........................ 720/609 |
| 7,216,195 | B1 | 5/2007 | Brown et al. |
| 7,280,352 | B2 | 10/2007 | Wilson et al. |
| 7,295,442 | B2 | 11/2007 | Garnett et al. |
| 7,551,427 | B1 | 6/2009 | Blaugrund et al. |
| 7,770,847 | B1 | 8/2010 | Severson |
| 7,916,471 | B2 | 3/2011 | Miyamoto et al. |
| 8,291,247 | B1 * | 10/2012 | Jupin ....................... H04N 5/63 348/705 |
| 2003/0081378 | A1 | 5/2003 | Debbins et al. |
| 2006/0080504 | A1 | 4/2006 | Kreiner et al. |
| 2010/0039251 | A1 * | 2/2010 | Mohebbi ............. G08B 27/008 340/501 |
| 2010/0311254 | A1 | 12/2010 | Huang |

FOREIGN PATENT DOCUMENTS

| CN | 101819303 A | 9/2010 |
|---|---|---|
| EP | 1318444 A2 | 6/2003 |

OTHER PUBLICATIONS

"MB994SP-4S 4 in 1 SAS/SATA Hot Swap Backplane RAID Cage"; http://www.icydock.com/goods.php?id=114: 3 pages.
International Search Report Jun. 28, 2012. Application No. PCT/US2011/057599.
"AES Lounge"; Oct. 7, 2011 as it appeared; http://www.iaik.tugraz.at/content/research/krypto/AES/.
http://csrc.nist.gov/publications/fips/fips197/fips-197.pdf.

* cited by examiner

*Primary Examiner* — Muhammad N Edun

(74) *Attorney, Agent, or Firm* — Hewlett Packard Enterprise Patent Department

(57) ABSTRACT

A drive carrier includes a first computing device with light source control capacity and a light source proximate to a front plate of the drive carrier. The first computing device receives a signal from a second computing device (external to the drive carrier) and controls the light source proximate to the front plate of the drive carrier based on the signal.

15 Claims, 11 Drawing Sheets

DRIVE CARRIER LIGHT SOURCE CONTROL

BACKGROUND

Today's data storage demands have created a need for systems that can store large amounts of data. To this end, chassis have been developed to accommodate a plurality of drives such as hard disk drives (HDD). Each of these drives is typically deposed within a drive carrier. Among other things, the drive carrier may serve to lock and hold the drive in a particular position within the chassis, and to protect the drive from electromagnetic energy interference (EMI) which may be caused by neighboring drives.

BRIEF DESCRIPTION OF THE DRAWINGS

Example embodiments are described in the following detailed description and in reference to the drawings, in which.

DETAILED DESCRIPTION

Figure 1:
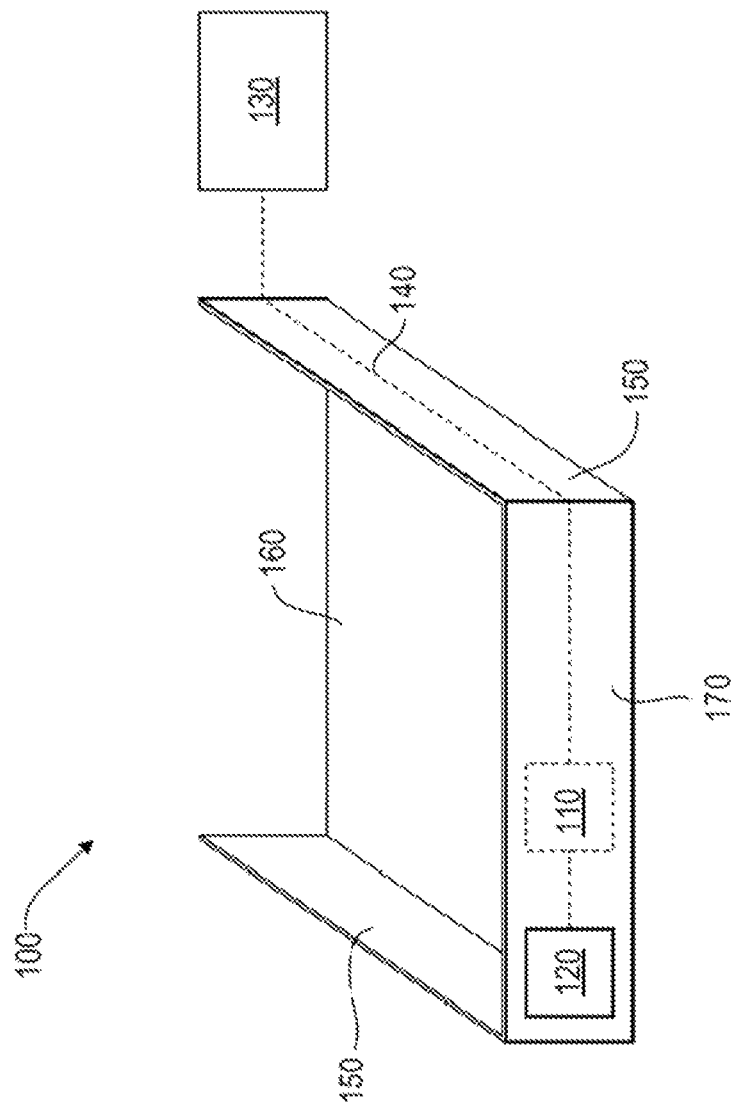
FIG. 1 is a block diagram of a drive carrier in accordance with embodiments.

Disclosed are embodiments of a drive carrier with an integrated light source (e.g., light emitting device (LED)) controller. In addition, disclosed are embodiments directed to enhanced and/or novel drive carrier indications which enable the drive carrier to convey large amounts of information to a viewer in an efficient, intuitive, and/or previously unforeseen manner.

Typical drive carriers include two light sources on the front panel. The light sources generally have three states: on, off, or blinking. One light source may indicate information such as locate/fault, and the other light source may indicate information such as online/activity. Each light source is generally created via a light pipe coupled to a rear connector assembly. The light from the Sight pipe appears on the front of the drive carrier in the form of a small illuminated circle or square. This arrangement provides minimal illumination and does net clearly convey the intended information to a viewer. For instance, it may be unclear to a viewer what is meant by a small blinking green light. Consequently, a viewer may have to reference a user's manual in order to determine the intent of the blinking green light. Furthermore, when there are numerous drives carriers situated within a chassis, it may be difficult to distinguish and/or notice one illuminated small circle or square from among the sea of other similar light sources.

Embodiments described herein provide for a drive carrier that conveys large amounts of information to a viewer in en efficient, intuitive, and/or previously unforeseen manner. More specifically, embodiments provide a drive carrier with an integrated light source controller and light source. The light controller and light source may be disposed on a flexible cable affixed to the drive carrier. The light controller may be configured to receive a signal and based thereon control the light source to convey a vast amount of information to a viewer in an efficient, intuitive, and/or previously unforeseen manner. Such information may be provided by, e.g., an animated light source arrangement, a do not remove indication, and/or an activity backlight.

More specifically. In embodiment the drive carrier may comprise a first computing device (e.g., a microcontroller) with light source control capability. The drive carrier may also comprise a light source proximate to a front panel of the drive carrier. The first computing device may receive a signal from a second computing device or host device external to the drive carrier (e.g., a HDD, an array controller, and/or a server) and control the light source based on the signal. The first computing device and the light source may be disposed on a flexible printed circuit board affixed to the drive carrier, and the first computing device may communicate with the second computing device via a serial or parallel communication bus, e.g., an Inter-Integrated Circuit ($I^2C$) bus.

In embodiments, the first computing device may control the light source to substantially illuminate an area larger than one square inch. This area may be an air flow area and/or air vent. The Illumination may be used in conjunction with a drive locate feature to make it easier to identify the drive within a chassis full of drives. In one example, the first computing device may cause a blue light source to illuminate a large area reserved for airflow. A hard drive eject handle located above the airflow area may block direct light from the blue light source and cause the light to reflect underneath the handle, thereby creating a backlight look with respect to the airflow vent. This blue backlight may encompass an area larger than one or two square inches, and therefore make the drive carrier easier to identify within a chassis full of drives. Such effortless identification may be used in conjunction with the drive locate feature to make it more efficient for a user on-site to identify a particular drive that another user is causing to illuminate (e.g., from a remote or local location). This may ease the burden on on-site technicians trying to locate a drive among a plurality of drives based simply on a tiny light pipe-illumination.

In further embodiments, there may be a plurality of light sources controlled by the first computing device. The first computing may control the plurality of light sources to produce a self-describing animated image. This may be accomplished by turning on and off the plurality of light sources in a predetermined or predeterminable sequence, in one example, the multiple light sources may be arranged in a circle or ring configuration. The computing device may turn on/off the light sources to produce an animated image of a spinning disk or hard drive activity. Moreover, the computing device 110 may turn cm/off the light at a particular rate to give the appearance of varied intensity/brightness. This animated image of a spinning disk may be activated when, for example, the first computing device determines that an associated HDD has an outstanding command. Hence, a viewer of the drive carrier can efficiently and intuitively determine hard drive activity based on the self-describing indication of a spinning disk. This may ease the burden on a viewer attempting to determine hard drive activity based simply on, e.g., a light pipe illuminating a small square or circle.

In some embodiments, the first computing device may control the light source to illuminate a do not remove indication. The do not remove indication may be part of an eject button and may be created via an in-mold decorating process. More specifically, in an example, the first computing device may control a light source inside a hard drive carrier eject button such that an icon is illuminated to inform a viewer that electing the drive will result in a logical drive failure. A user, therefore, has instant knowledge and confidence that a drive is safe to remove. As a result, self-inflicted logical drive failures may be reduced. Moreover, removal of a drive against an administrator's wishes or in violation of another rule may be reduced.

FIG. 1 is a block diagram of a drive carrier 100 in accordance with embodiments. The drive carrier 100 may include a computing device 110 and a light source 120. The computing device 110 may have light source control capability and may receive a signal from a second computing device 130 via signaling path 140. The computing device 110 may control the light source 120 based on the signal received from the second computing device 130. The second computing device 130 may be external to the drive carrier 100.

The drive earner 100 may be constructed of plastic, metal, and/or other materials. It may include opposing sidewalls 150, a floor 160, and a front plate or bezel 170. The light source 120 may be proximate to the front plate 170 of the drive carrier 100. A drive such as a hard disk drive (HDD), sold state drive (SSD), or hybrid drive may be placed within and/or attached to the area formed by the opposing sidewalls 150, floor 160, and front plate 170. The HDD may use spinning disks and movable read/write heads. The SSD may use solid state memory to store persistent data, and use microchips to retain data in non-volatile memory chips. The hybrid drive may combine features of the HDD and SSD into one unit containing a large HDD with a smaller SSD cache to improve performance of frequently accessed files. Other types of drives such as flash-based SSDs, enterprise flash drives (EFDs), etc. may also be used with the drive carrier.

The first computing device 110 may be a microcontroller, microprocessor, processor, expander, driver, and/or computer-programmable logic device (CPLD) with light source control capability. The light source control capability may be realized via firmware, software, and/or other computer-executable instructions on the computing device 110 which cause the computing device 110 to drive a general purpose input/output port, light source port, and/or other port and thereby control the light source in a specific manner. For example, the port may be driven logic-level HIGH, logic level LOW, or no logic-level output, and thereby cause the light, source to illuminate in various manners. In some embodiments, the port may be driven in a manner that cycles the light source on and off to provide a visual effect of varying intensity.

The light source 120 may be a light emitting device (LED), an incandescent light source, a fluorescent light source, a neon light source, or any other type of light source, in one example, the light source may be a right angle mounted blue LED attached to the same flex cable to which the computing device 110 is attached.

The second computing device 130 may be a drive attached or associated with the drive carrier (e.g., HDD, SDD, or hybrid drive), an array controller, a server, and/or a host device. The second computing device 130 may further be a desktop, laptop, hand held device, smartphone, tablet, etc.

Signaling path 140, electronically connecting the first computing device 110 and the second computing device 130, may comprise a serial communication bus, a parallel communication bus, an Inter-Integrated Circuit ($I^2C$) bus, a wired link, a wireless link, a local area network (LANs), a wide area network (WAN), a telecommunication network, the Internet, a computer network, a Bluetooth network, an Ethernet LAN, a token ring LAN, a serial advanced technology attachment (SATA), and/or a serial attached SCSI (SAS).

As discussed in greater detail below with reference to FIGS. 5-12, the first computing device 110 may control the light source 120 to provide information in intuitive, efficient, and/or unforeseen manner in response to a signal received from the second computing device 130.

Figure 2:
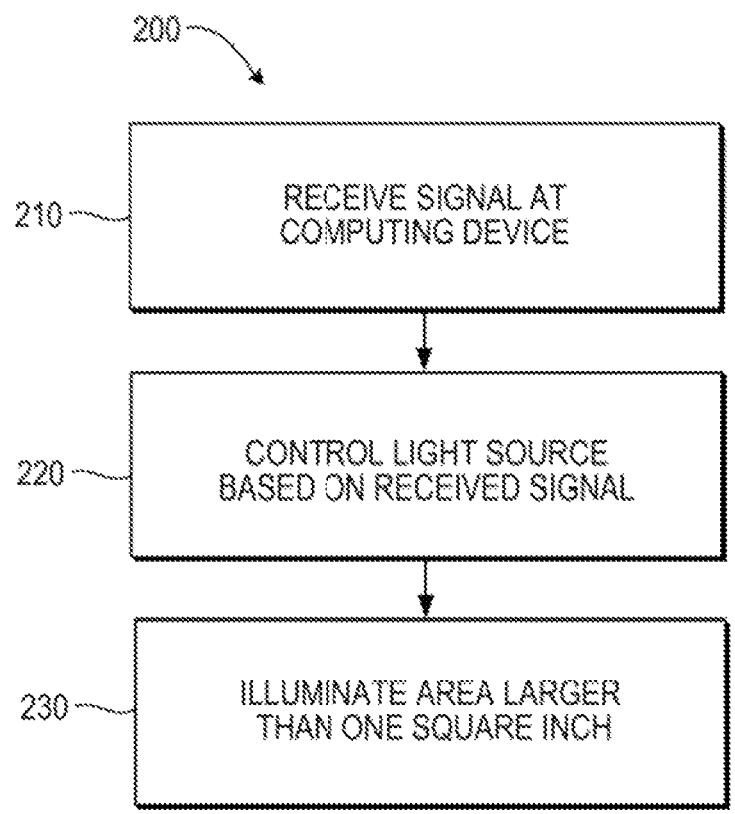
FIG. 2 is a process flow diagram of a method in accordance with embodiments.

FIG. 2 is a process flow diagram of a method in accordance with embodiments. The method 200 may be performed by computing device 110 in FIG. 1, and may involve light source 120 of FIG. 1. Drive carrier 100 in FIG. 1 may include both the computing device 110 and the light source 120.

The method may begin at block 210, wherein the computing device receives a signal. The computing device 110 may be disposed on a flexible printed circuit board (see FIG. 4) affixed to the drive carrier 100) (see FIG. 5), and may receive the signal from a second computing device or host device such as a drive, array controller, and/or server. At block 220, the computing device 110 may control a light source 120 disposed on the drive carrier based on the received signal. At block 230, the controlling by the computing device 110 may cause the light source to substantially illuminate an area larger than one square inch on the front of the drive carrier.

Figure 3:
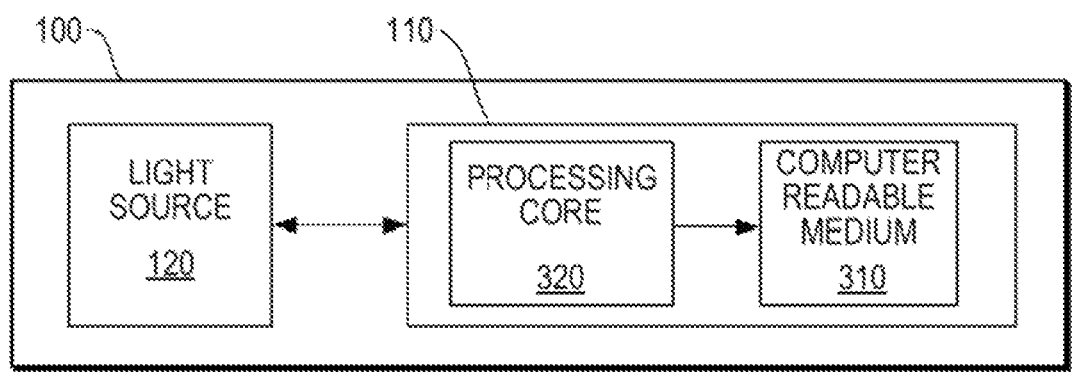
FIG. 3 is a block diagram showing a non-transitory, computer-readable medium having computer-executable instructions stored thereon. In accordance with embodiments.

FIG. 3 is a block diagram showing a non-transitory, computer-readable medium having computer-executable instructions stored thereon in accordance with embodiments. The non-transitory, computer-readable medium is generally referred to by the reference number 310 and may be included in computing device 110 of drive carrier 100 described in relate to FIG. 1. The non-transitory computer-readable medium 310 may correspond to any typical storage device that stores computer-implemented instructions, such as programming code or the like. For example, the non-transitory computer-readable medium 310 may include one or more of a non-volatile memory, a volatile memory, and/or one or more storage devices. Examples of non-volatile memory include, but are not limited to, electronically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical devices, and flash memory devices.

A processing core 320 generally retrieves and executes the instructions stored in the non-transitory, computer-readable medium 310 to operate the computing device 110. In embodiments, the instructions, upon execution, may cause the computing device 110 to receive a signal from a second computing device external to the drive carrier 100 and control light source 120 based on the received signal. In embodiments, the first computing device and light source may be disposed on a flexible printed circuit board affixed to the drive earner (see FIGS. 4 and 5). Furthermore, in some embodiments, the computing device 110 may communicate with the second computing device 130 via a communication bus such as an I²C bus.

Figure 4:
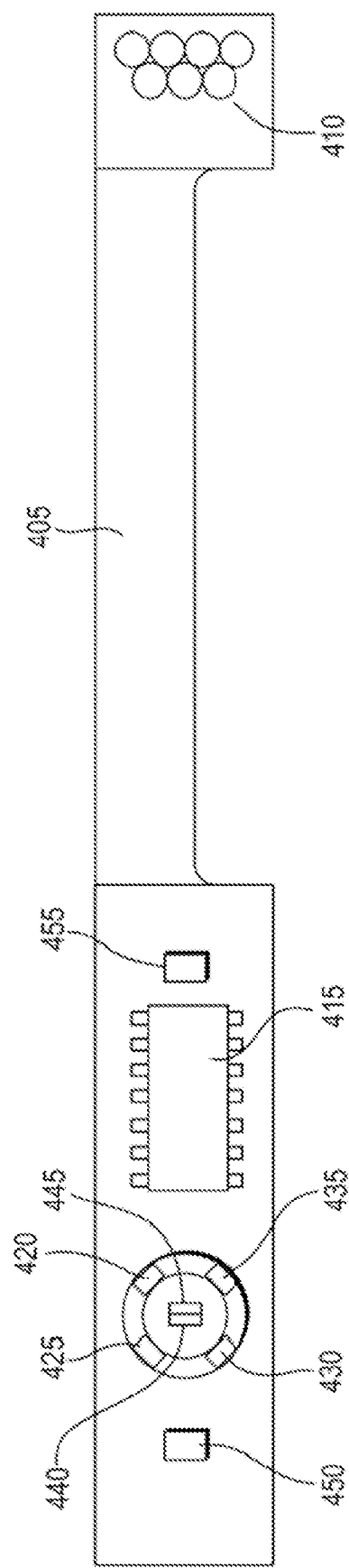
FIG. 4 is a graphical representation of a flexible printed circuit board assembly in accordance with embodiments.

FIG. 4 is a graphical representation of a flexible printed circuit board assembly in accordance with embodiments. This flexible printed circuit board assembly may be affixed to the drive carrier 100 in the manner depicted in FIG. 5. In particular, the flexible printed circuit assembly may be coupled to the rear of the drive carrier 510, one of the opposing sidewalls 520, and the front of drive carrier 530. Of course, alternate configurations could also be used.

Figure 5:
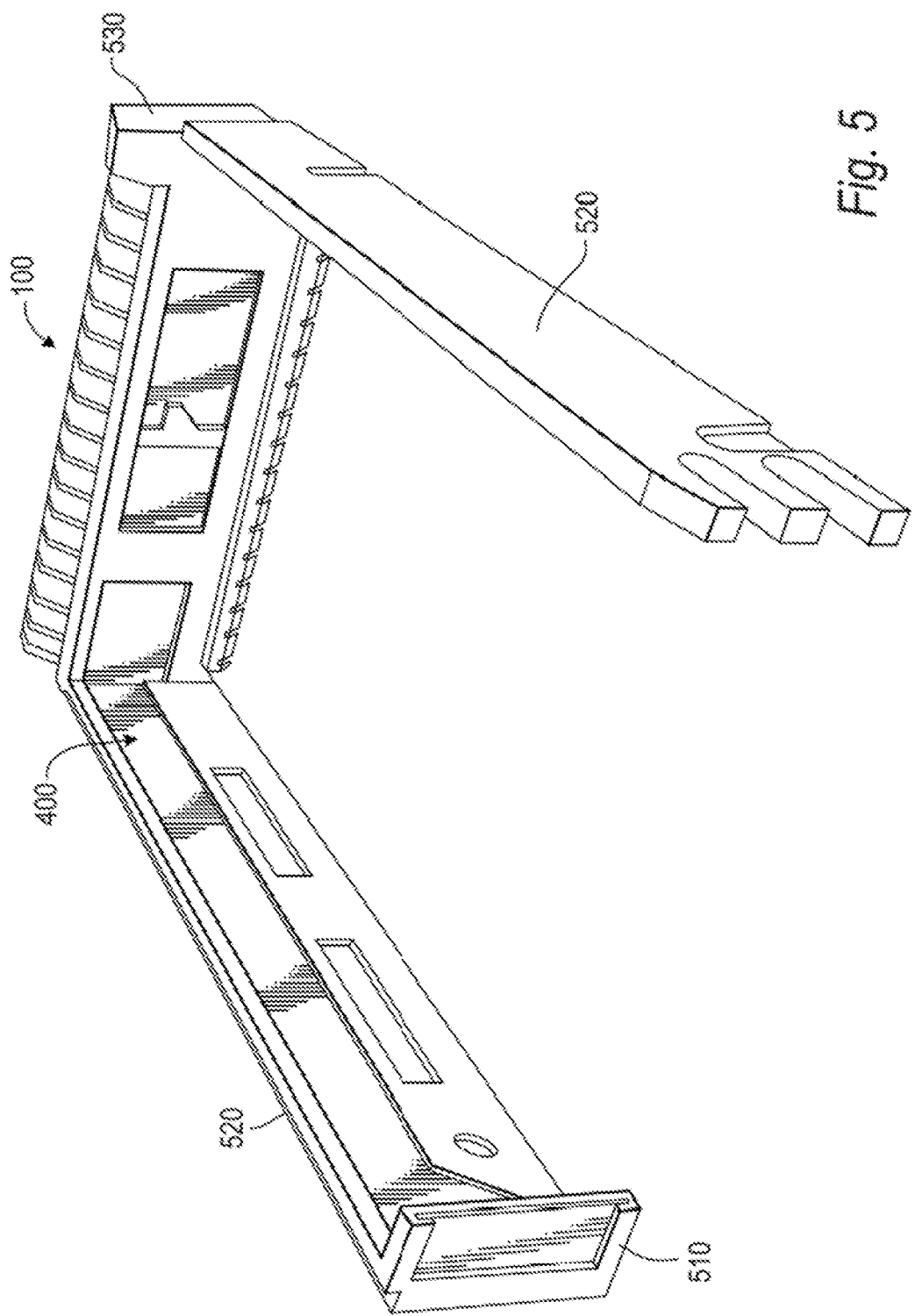
FIG. 5 is a graphical representation of a flexible printed circuit board assembly affixed to a drive carrier in accordance with embodiments.
Figure 6:
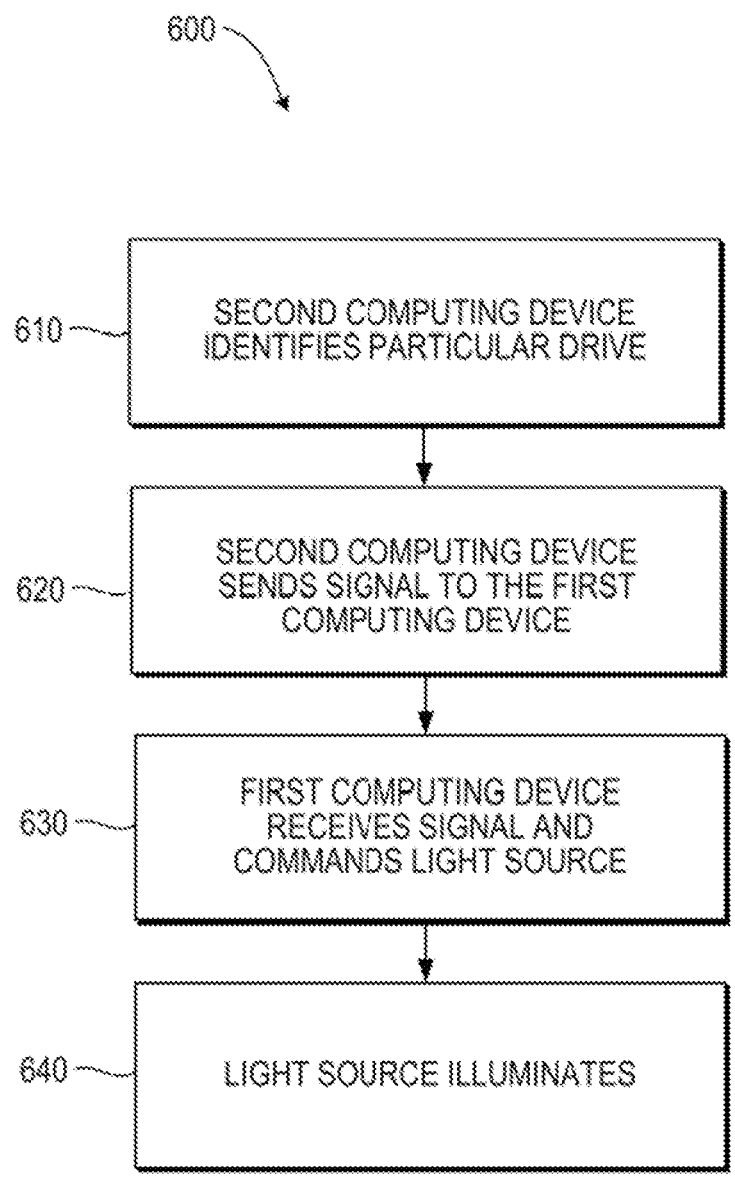
FIG. 6 is a process flow diagram of a drive locate process in accordance with embodiments.

The flexible printed circuit board assembly may comprise a flexible printed circuit board 405, a pad 410, a computing device 415, and/or various light sources 420-466. As described in greater detail below, in embodiments, light sources 420-436 may be controlled by computing device 415 to provide an animated indication, light sources 440 and 445 may be controlled by computing device 415 to provide multiple online/fault indications, light source 450 may be controlled by computing device 415 to provide a locate indication, and light source 455 may be controlled by computing device 415 to provide a do not remove indication. While FIGS. 4 and 5 depict a flexible printed circuit assembly, it should be understood that other types of substrates may be used. For example, embodiments implement a hard printed circuit board affixed to the drive carrier.

Below am further descriptions of the manner by which the computing device 110 may control the light source 120 to provide information in an enhanced and/or novel manner. It should be understood that those indications are examples and other indications and/or variations may also be possible, it should also be understood that these indications are not mutually exclusive, and multiple indications could be simultaneously and/or sequentially displayed.

Drive Locate Indication

Figure 8:
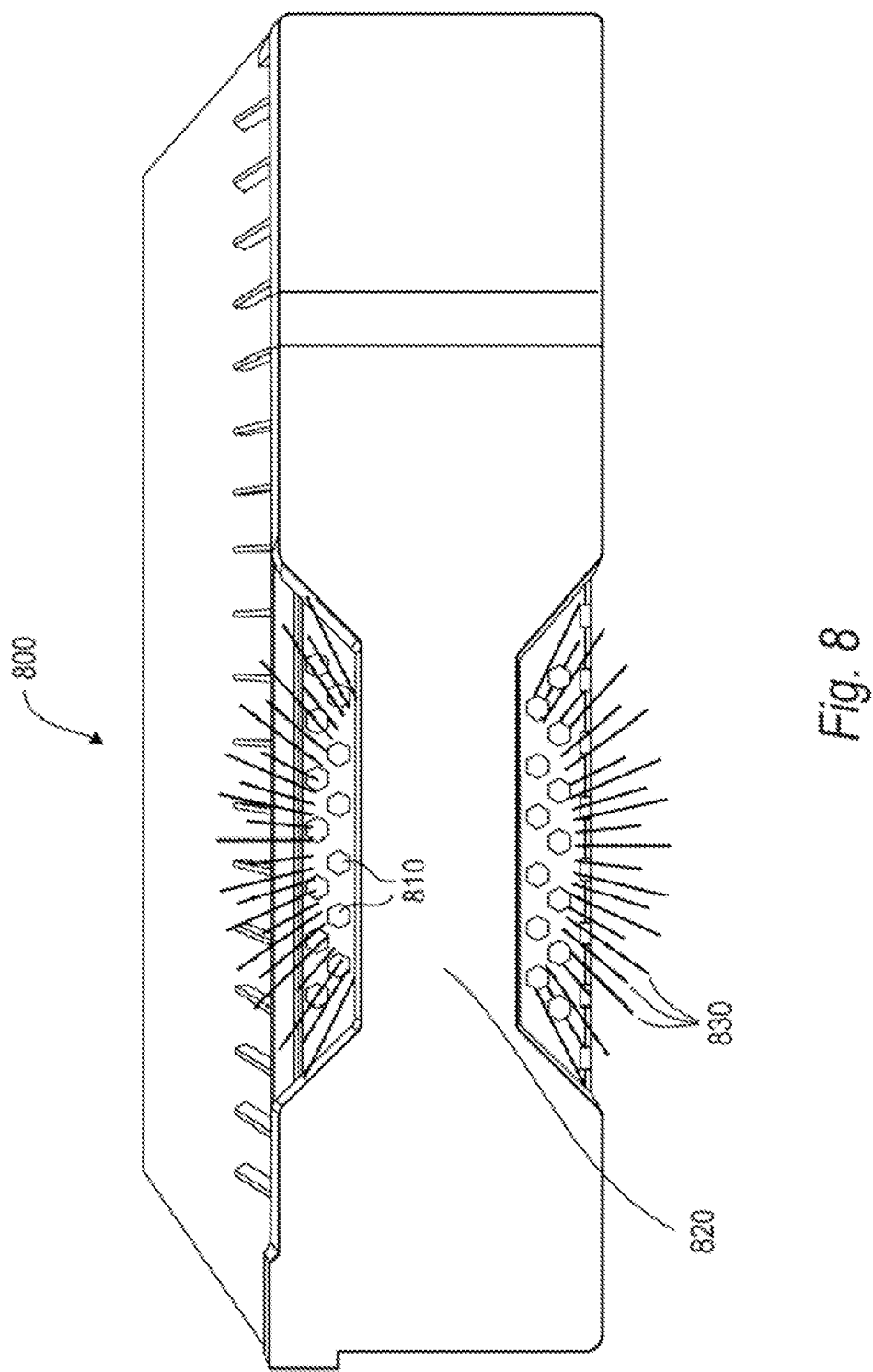
FIG. 8 is a graphical representation of a drive carrier with a drive locate fight source activated in accordance with embodiments.

Embodiments enable enhanced drive locate functionality. FIG. 8 is a process flow diagram of a drive locate process 600 in accordance with embodiments. The method may begin at block 610, where a second computing device and/or user associated with the second device identifies a particular drive that may need to be located on-site. This second computing device or host device may be, e.g. a server, array controller, desktop, laptop, hand held device, smartphone, tablet, etc, located proximate to the drive carrier (e.g., in the same room) or remote from the drive carrier (e.g., in a different facility or state). The second computing device and/or user associated therewith may desire for the drive to be located so that e.g., a technician on-site can know with certainty which drive to configure, remove, and/or repair.

At block 820, the second computing device sends a signal to a first computing device at a drive carrier requesting that the drive locate feature of the drive earner be activated. In embodiments, the second computing device may be a server which uses a server utility to send a signal identifying a particular drive to an array controller which subsequently sends a signal to the first computing device located on a flex cable affixed to the drive carrier via an I²C bus.

At block 630, the first computing device receives the signal and commands a light source based thereon. In embodiments, this process may comprise receiving a signal from the second computing device, parsing the received signal, and driving a port electronically coupled to the light source based thereon.

At block 840, the light source receives the command from the first computing device and illuminates in the manner instructed by the signal.

Figure 7:
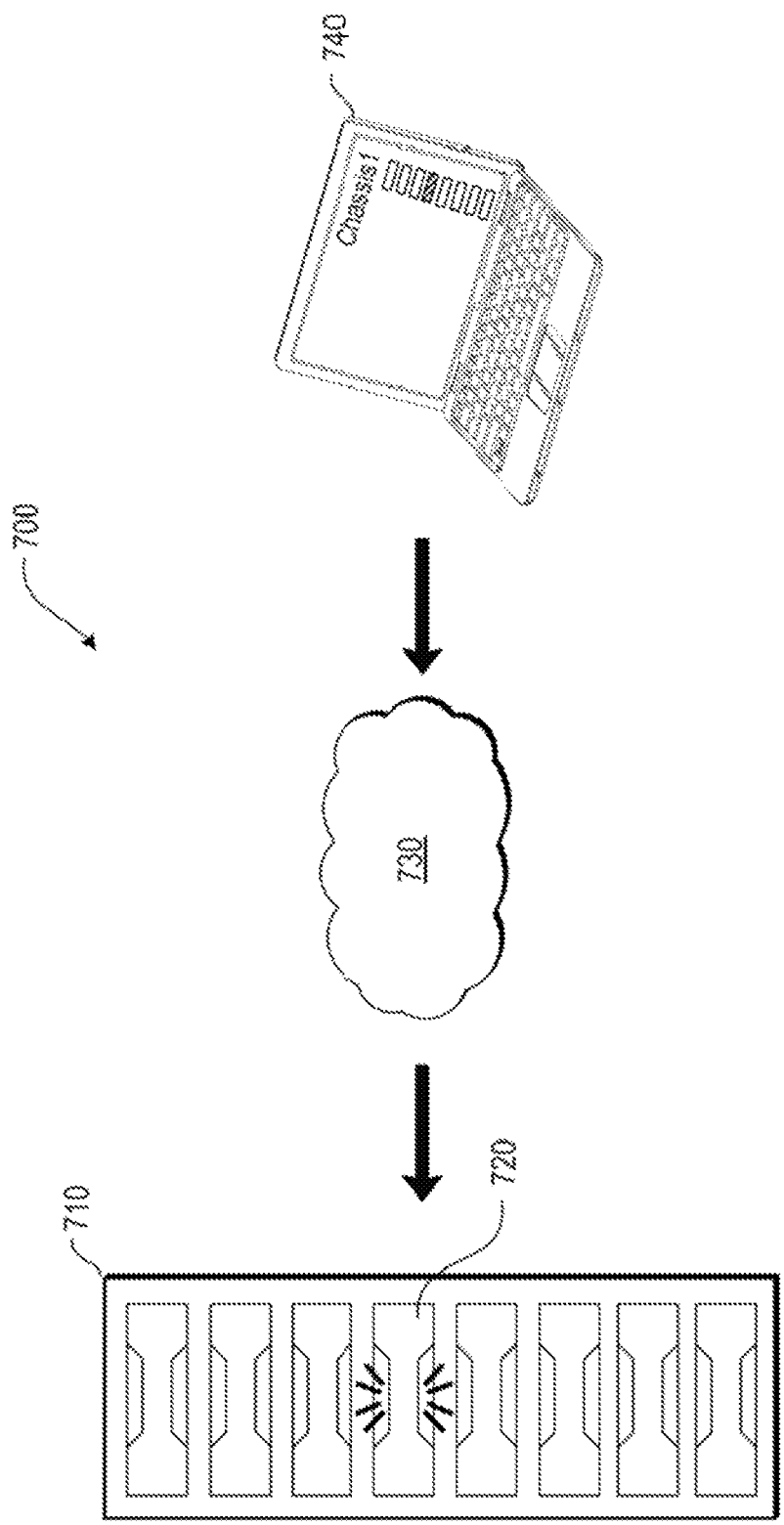
FIG. 7 is a graphical representation of a system implementing a drive locate process in accordance with embodiments.

FIG. 7 is a graphical representation of a system 700 implementing the above-mentioned drive locate process in accordance with embodiments. As illustrated, a second computing device 740 may issue a command to trigger the drive locate feature on a particular device 720 within a chassis 710. The signal may travel via a network 730 to a first computing device (not shown) of the particular drive 720. As illustrated and described with respect to FIG. 8, this signal may cause the drive 720 to illuminate in a manner that makes it easy to identify a particular drive from among potentially hundreds of drives within a data storage facility (i.e., in a manner far superior to traditional round or square light pipe illumination). Network 730 may include, hut is not limited to, a serial communication bus, a parallel communication bus, an Inter-Integrated Circuit (I²C) bus, a wired link, a wireless link, a local area network (LAN), a wide area network (WAN), a telecommunication network, the Internet, a computer network, a Bluetooth network, an Ethernet LAN, a token ring LAN, a serial advanced technology attachment (SATA), and/or a serial attached SCSI (SAS).

FIG. 8 is a graphical representation of a drive earner 700 with the drive-locate light source activated in accordance with embodiments. As shown, the light source may be arranged behind an air vent 810 and a handle 820 (a space traditionally reserved for airflow and not generally used for other purposes). The light from the light source (e.g., a 90-degree blue LED) may travel through openings on the air vent 310 and reflect off the underneath of the handle 820, thereby creating a large backlight beneath the handle. This backlight may comprise an area of at least one square inch. That is, the light source may substantially illuminate an area larger than one square inch and consequently make the drive easy to spot within a rack full of hard drives. The illumination may be in the form of a backlight (i.e., indirect light), or, in some embodiments, the handle may not be located in an area that blocks the light from the light source, and the light may be direct light from the light source, in further embodiments, the handle or other portion on the drive carrier (e.g., air vent) may be clear plastic, thereby allowing the light to pass through the clear plastic and illuminate a maximum area.

It should be noted that element 820 does not have to be used as a handle to hold the drive. In embodiments, element 820 may be a portion of plastic and/or metal designed in a manner to enable light to illuminate ten beneath. The plastic and/or metal may be slimmer than other portions on the front bezel of the drive carrier to allow for maximum light to illuminate via the air vent 820.

In embodiments, the light source may provide a colored light (e.g., blue, green, red, etc.) or a white light. The light source may also vary overtime in intensity to give a glowing look, or may blink at a predeterminable or predetermined rate to draw extra attention to the drive. In embodiments, the light source may comprise one, two, three, four, or five LEDs.

In embodiments, the light source may be dedicated to one particular indication. While this indication has been described above as the drive locate indication, it should be understood that the above-described light source arrangement may be used to provide any indication, including, but not limited to, do not remove, drive activity, online, and/or fault. Stated differently, the illumination of a large area proximate to an air flow vent may be used to provide any type of indication in a manner that makes it easy for a user to spot the indication.

Self-Describing Animated Drive Activity Indication

Embodiments provide a self describing animated drive activity indication. In particular, a plurality of light sources may be controlled by the first computing device 110 to produce a self-describing animated image. This may be accomplished by turning on and off the plurality of light sources in a particular sequence to produce an animated image. In one example, the multiple light sources may be arranged in a circular or ring configuration. The computing device 110 may turn on/off of the Sight sources to produce an animates image of a spinning disk. This animated image of a spinning disk may be activated when, for example, the first computing device 110 determines that an associated HDD has an outstanding command. A viewer of the drive carrier, therefore, can efficiently and intuitively determine hard drive activity is occurring based on the self-describing image of a spinning disc, as opposed to attempting to determine hard drive activity based simply on a light pipe illuminating a small circle or square.

Figure 9:
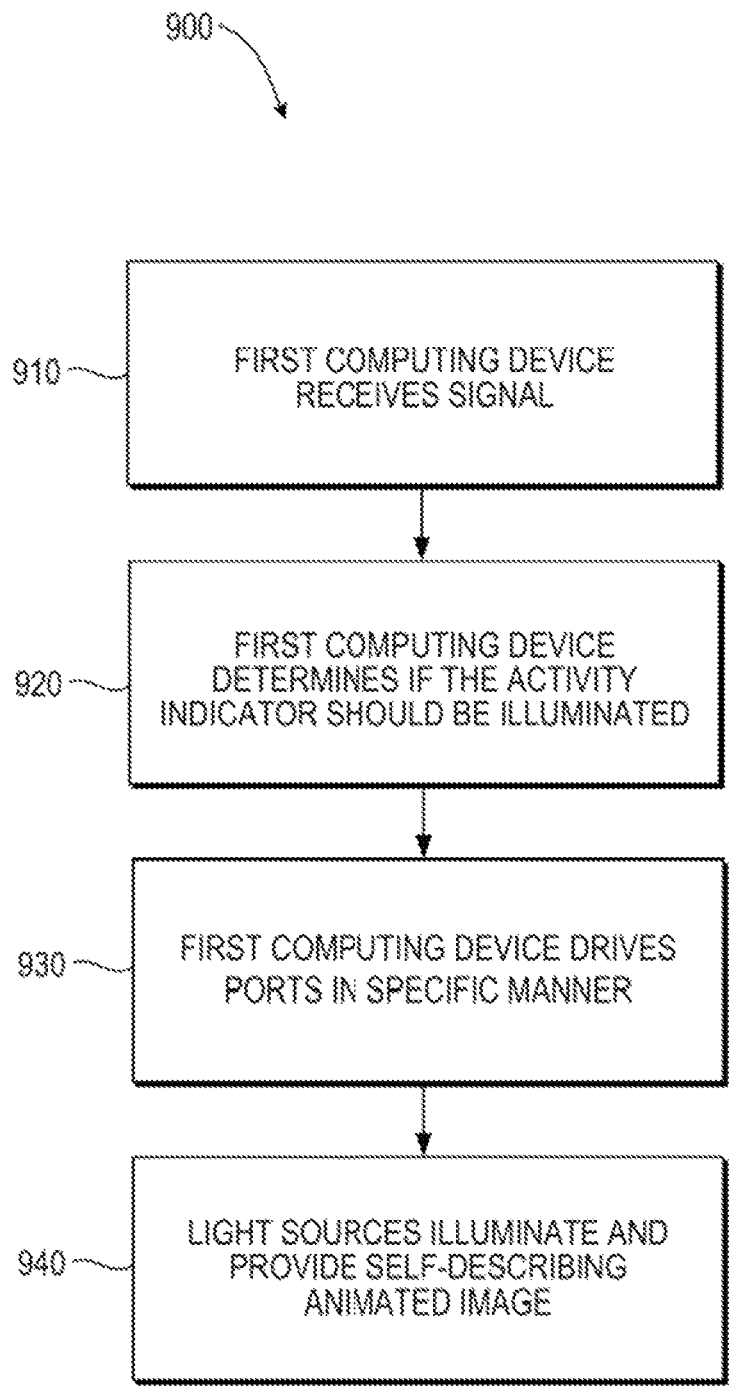
FIG. 9 is a process flow diagram of a process to provide an animated activity indication in accordance with embodiments.

FIG. 9 is a process flow diagram of a method 900 to provide an animated activity indication in accordance with embodiments. The method may begin at block 910, where the first computing device 100 receives a signal from a second computing device 130. The second computing device 130 may be a drive attached the drive carrier 100 comprising the first computing device 110, and the first computing device 110 may be configured to periodically poll the drive (e.g., via SAS/SATA HDD pin 11) to determine if the drive has at least one outstanding command. This polling may help normally the activity indication in the event that multiple HDDs from multiple manufacturers are located within a single chassis. More specifically, if multiple HDDs from multiple manufacturers are used in a chassis, each may output signals indicating HDD activity at different times. This may result in the first computing device for each drive carrier receiving HDD output signals at different times and therefore controlling the light sources at different times. By using polling as opposed to waiting to receive a signal, normalization occurs and each drive carrier may control the lights in a substantially synchronous manner, notwithstanding the difference in HDD manufacturers.

Alternatively or in addition, the drive (i.e., second computing device 130) may be configured to send the signal to the first computing device without polling. The signal may indicate that the drive has at least one outstanding command.

In various embodiments, the second computing device 130 may be a device such as an array controller or server. These devices may be configured to send commands to the first computing device which instruct the first computing device to drive the light sources in a particular manner. The array controller and/or server may send these commands in response to a determination that a drive has at least one outstanding command or for another reason. Further, this command may be responsive to polling.

At block 920, the first computing device 110 receives the signal from the second computing device 130 and determines based thereon if the activity indicator should be illuminated. This could be, for example, in response to a determination that a drive has at least one outstanding command, or in response to a command from an array controller or server. At block 930, the first computing device 110 drives pods electronically coupled to a plurality of light sources in a predetermined or predeterminable manner. At block 940, the plurality light sources illuminate in a manner that provides a self-describing animated image.

Figure 10:
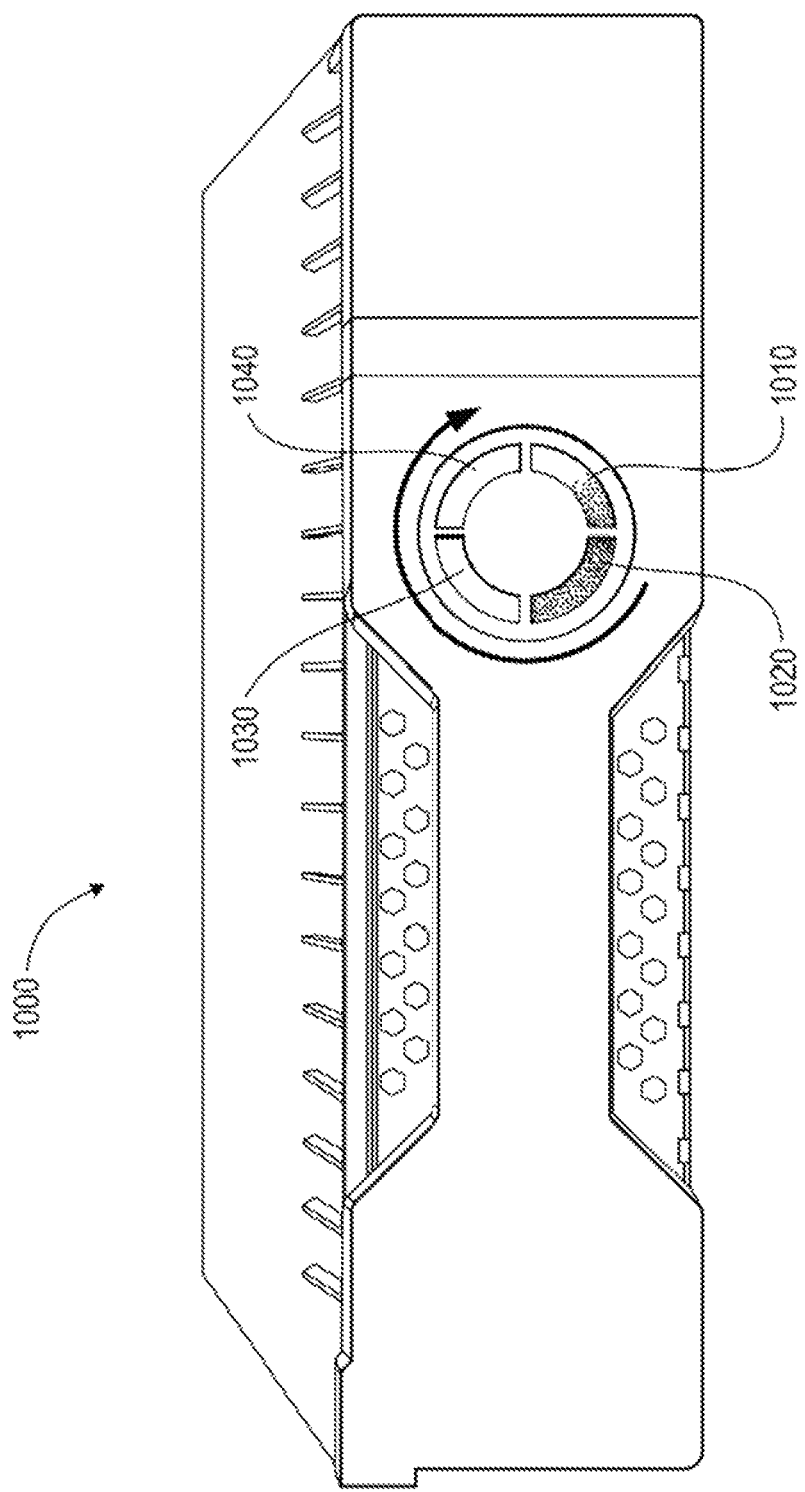
FIG. 10 is a graphical representation of a drive carrier with an animated drive activity indication in accordance with embodiments.

FIG. 10 is a graphical representation of a drive carrier 1000 with a self-describing animated drive activity indication in accordance with embodiments. The drive carrier includes four light-emitting areas (1010-1040) in a circular configuration, each shaped like a quarter of a circle. Four light sources are located below the light-emitting areas (1010-1040). These light sources may be configured in the manner shown in FIG. 4 (see light sources 420-435). The first computing device 110 may control these light sources to illuminate in a clockwise or counter-clockwise sequence to give the appearance of a spinning disc. This animated image self-describes to a viewer that the drive is active. This may eliminate the ambiguity associated with traditional drives that simply blink a small circle or square created by a light pipe. This further may eliminate the need for a viewer to reference a user's manual to determine the meaning of the indication.

It should be understood that FIG. 10 is merely an example, and numerous other arrangements may also be used to provide a self-describing animated indication. For example, any number of light-emitting areas of any shape with any number of light sources may be used. Additionally, the animated image does not have to be of a spinning disc. Other self-describing animated images such as waterfalls, arrows, meters, gauges, etc. may also be used to signify a particular status. The image should animate movement, be self describing, and/or enable the viewer to efficiently grasp the intent.

In embodiments, the first computing device may cause more than one light source to be illuminated at different intensity/brightness levels to effectuate the appearance of movement. For example and continuing with the above example of a spinning disc, the four light sources may be illuminated in 12 states in a 0.75 sec, rotation, as set forth in the table below:

| State | Brightness (LED1) | Brightness (LED2) | Brightness (LED3) | Brightness (LED4) |
| --- | --- | --- | --- | --- |
| 1 | 50% | Off | Off | off |
| 2 | 50% | Off | Off | off |
| 3 | 25% | 25% | Off | off |
| 4 | Off | 50% | Off | Off |
| 5 | Off | 50% | Off | Off |
| 6 | Off | 25% | 25% | Off |
| 7 | Off | Off | 50% | Off |
| 8 | Off | Off | 50% | Off |
| 9 | Off | Off | 25% | 25% |
| 10 | Off | Off | Off | 50% |
| 11 | Off | Off | Off | 50% |
| 12 | 25% | Off | Off | 25% |

In order to keep the total brightness output from the light sources constant throughout the different states, the brightness levels of each light source may be varied. For example, if one state uses one light source at 80% brightness, another state using two light sources would set each light source at 26% brightness so that the total brightness remains 50%.

In states when more than one tight source is illuminated, the intensity/brightness of each may be adjusted by the computing device toggling the light source on/off at a rapid rate, thereby giving the effect of a lower intensity.

Although the foregoing has described the animated indication with respect to drive activity, it should be understood that this animated indication could be used to indicate other types of information. For example, the animated activity could indicate an error, link rate, do not remove, drive locate, etc, in a self-describing and intuitive manner.

Do Not Remove Drive Indication

Embodiments provide a do not remove, drive indication. In particular, a light source may be controlled by the first computing device 110 to produce the do not remove indication. The light source may reside inside a hard drive carrier ejector button and illuminate an icon to, e.g. inform a user that ejecting the hot-plug drive may result in a logical drive failure (i.e., based on a rule-set), or ejecting the hot-drive plug may be contrary to an administrator preference (i.e., based on a choice). In embodiments, the icon may either be illuminated or hidden (i.e., not visible). In addition, the icon may be based on the industry eject symbol in embodiments.

Figure 11:
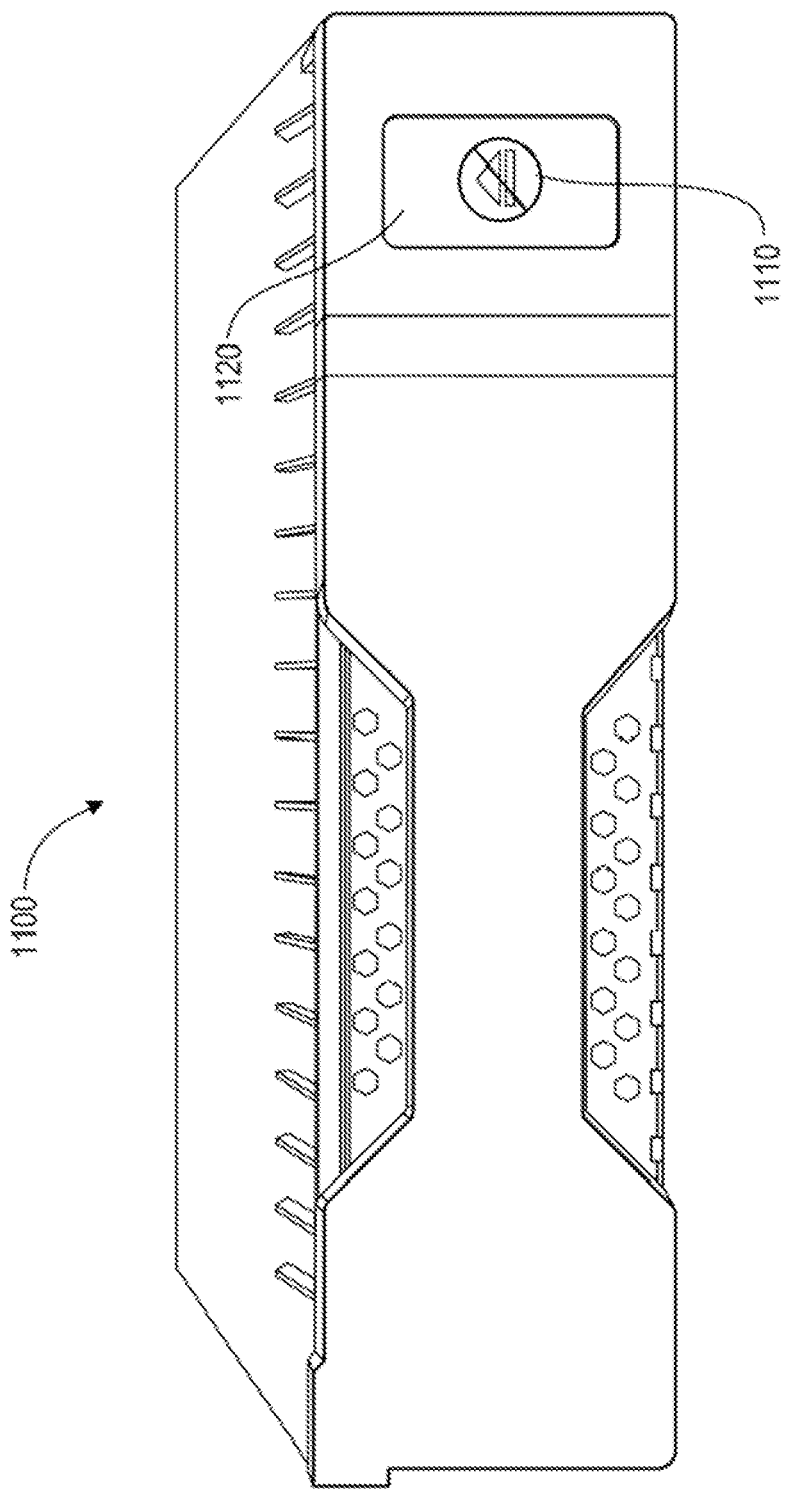
FIG. 11 is a graphical representation of a drive carrier with a do not remove indicated in accordance with embodiments.

FIG. 11 is a graphical representation of a drive carrier 1100 with a do not remove indication 1110 in accordance with embodiments. As shown, the do not remove indication 1110 may be located on a hard drive carrier ejector button 1120. The indication 1110 may comprise the industry standard eject symbol surrounded by a circle with a line going through the eject symbol, in alternate embodiments, the indication 1110 may be text (e.g., "Do Not Remove") and/or another symbol.

FIG. 11 shows the do not remove indication 1110 in an illuminated state. Via a dead front process and/or an in-mold decorating process, the do not remove indication 1110 may be nearly invisible when not backlight by the light source. As a result, there may be no ambiguity as to whether or not the do not remove indication is active.

In embodiments, the light source may be of a color necessary to balance against the color of the hard drive carrier ejector button 1120. For example, if the hard drive carrier ejector button 1120 is red in color and the desire is for the do not remove indication 1110 to appear white to a viewer, a light source which illuminates green and blue may be used to balance against the red color of the button, and therefore, in combination, make the do not remove indication 1110 appear white to a viewer. Stated differently, light from an aquamarine light source may pass through the red ejector button 1120. The red ejector button 1120 may subtract green and blue from the light thereby producing equal amounts of red, green, and blue light, and appear white to a viewer. If such a process were not implemented, and instead a white light source were used, the do not remove indication 1110 would appear pink after the light passes through the red ejector button.

In embodiments, the do not remove indication may be illuminated to inform a viewer that ejecting the hot-plug drive may result in a logical drive failure (i.e., based on a rule-set). More specifically, an array controller may monitor Redundant Array of independent Disks (RAID) levels, RAID statuses, and/or drive locations, and, when the array controller determines that the removal of a drive may result in a logical drive failure, the array controller may send a signal (e.g., an I²C write command) to the first computing device 110 indicating that the do not remove indication 1110 should be illuminated. This may help reduce the amount of self-inflicted logical drive failures. Moreover, this may provide a user with instant confidence that removing a certain drive will not result in a logical drive failure.

For example, in a RAIDS configuration with three drives, the array controller may determine that one of the three drives may be removed without causing a logical drive failure. However, if two of the three drives are removed, a logical drive failure will occur. The array controller would therefore monitor the drives and cause the do not remove indication 1110 to be illuminated on two of the drives in response a determination that the third drive has been removed.

Other rule-sets may be based on whether or not the drive is conducting a shut-down process, write cashing, being configured, etc, in any case, the computing device 110 will cause the light source to illuminate the do not remove indication 1110 to inform a user that it is not safe to remove the drive.

In some embodiments, the do not remove indication may be illuminated to inform a viewer that ejecting the hot-plug drive is contrary to an administrator preference (i.e., based on a administrator choice). For example, an administrator may prefer that every drive illuminate the do not remove indication at all times. The array controller would therefore send a signal to every associated drive carrier to continuously illuminate the do not remove indication 1110 based en this user-preference.

In some embodiments, in order to reduce the part count and overall manufacturing costs of the eject button, an existing portion of sheet metal or EMI sheet metal may be used to provide a spring force to return the eject button to a default position after depression. More specifically, a latch spring may be integrated into the sheet metal by creating a bent flange that serves as a cantilever spring behind the button. This eliminates the need for a separate part and added assembly time in order to provide the spring force to the eject button. This arrangement may also be used with buttons other than the eject button.

Figure 12:
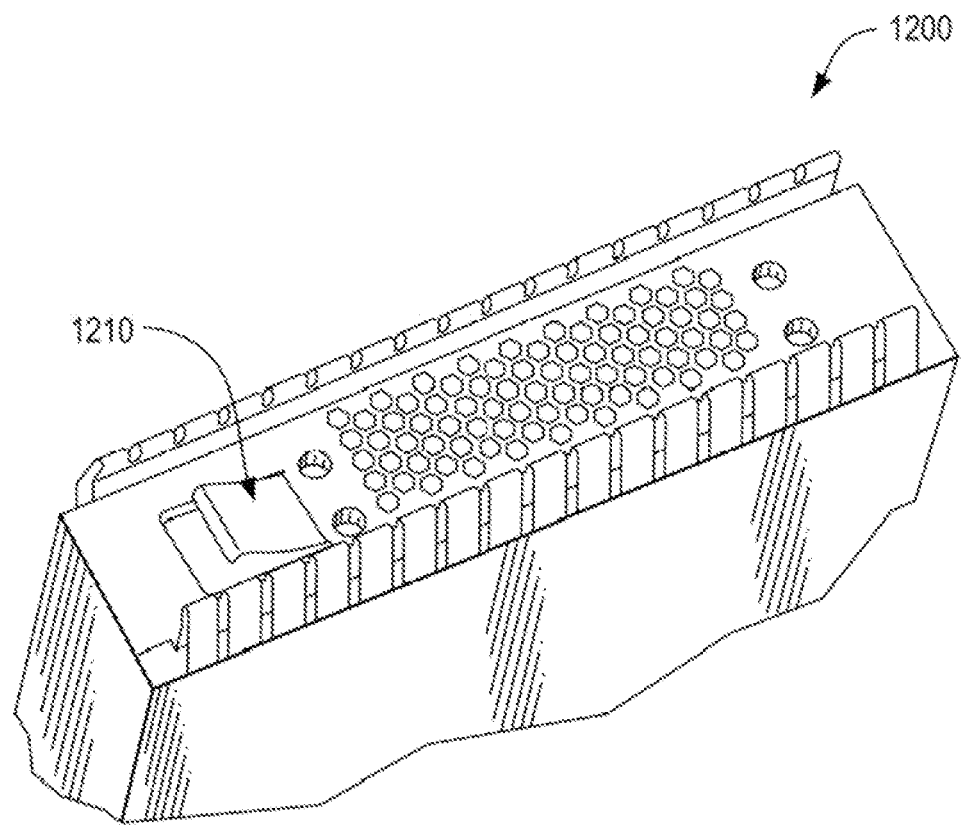
FIG. 12 is a graphical representation of a spring integrated into sheet metal in accordance with embodiments.

FIG. 12 provides a graphical representation of the latch spring 1210 integrated into the sheet metal of the drive carrier 1200 in accordance with embodiments. In order to expose the latch spring 1210, the front cover 170 is shown removed in FIG. 12. The latch spring is integrated into the sheet metal by creating a bent flange that serves as a cantilever spring behind the button.

What is claimed is:

1. A drive carrier comprising:
 a first computing device with light source control capability; and
 a light source comprising a plurality of light sources and proximate to a front plate of the drive carrier,
  wherein the first computing device is to receive a signal from a second computing device and control the light source based on the signal;
  wherein controlling the light source comprises turning on and off the plurality of light sources in a sequence to produce a self-describing animated image associated with a drive coupled to the drive carrier; and
  wherein the second computing device is external to the drive carrier.

2. The drive carrier of claim 1, wherein the first computing device and light source are disposed on a printed circuit board affixed to the drive carrier, and wherein the first computing device is to communicate with the second computing device via a communication bus.

3. The drive carrier of claim 1, wherein the first computing device is to control the light source to substantially illuminate an area larger than one square inch on the drive carrier.

4. The drive carrier of claim 1, wherein the first computing device is to control the light source to illuminate an airflow area.

5. The drive carrier of claim 1, wherein the signal indicates that the drive associated with the drive carrier has an outstanding command.

6. The drive carrier of claim 1, wherein the first computing device is to control the light urce to illuminate a do not remove indication.

7. The drive carrier of claim 6, wherein the do not remove indication is part of an eject button.

8. The drive carrier of claim 7, wherein a bent portion of electromagnetic interference shield serves as a spring behind the eject button.

9. The drive carrier of claim 1, wherein the plurality of light sources is arranged in a ring configuration and the self-describing animated image resembles a spinning disk.

10. A non-transitory computer-readable medium having computer-executable instructions stored thereon that when executed cause a first computing device of a drive carrier to:
 receive a signal from a second computing device external to the drive carrier; and control a light source proximate to a front plate of the drive carrier based on the signal,
  wherein the light source comprises a plurality of light sources;
  wherein controlling the light source comprises turning on and off the plurality of light sources in a sequence to produce a self-describing animated image associated with a drive coupled to the drive carrier; and
  wherein the first computing device and light source are disposed on a printed circuit board affixed to the drive carrier.

11. The non-transitory computer-readable medium of claim 10, wherein the computer-executable instructions when executed cause the first computing device to control the light source to illuminate a do not remove indication.

12. The non-transitory computer-readable medium of claim 10, wherein the plurality of light sources is arranged in a ring configuration and the self-describing animated image resembles a spinning disk.

13. A method comprising:
receiving a signal at a computing device disposed on a printed circuit board affixed to a drive carrier; and
controlling a light source disposed on the drive carrier based on the signal,
  wherein the signal is received from second computing device;
  wherein the light source comprises a plurality of light sources; and
  wherein controlling the light source comprises turning on and off the plurality of light sources in a sequence to produce a self-describing animated image associated with a drive coupled to the drive carrier.

14. The method of claim 13, wherein the second computing device is a host device external to the drive carrier.

15. The method of claim 13, wherein the plurality of light sources is arranged in a ring configuration and the self-describing animated image resembles a spinning disk.

* * * * *

UNITED STATES PATENT AND TRADEMARK OFFICE
CERTIFICATE OF CORRECTION

Page 1 of 1

PATENT NO.      : 9,263,093 B2
APPLICATION NO. : 14/235572
DATED           : February 16, 2016
INVENTOR(S)     : M. Scott Bunker et al.

It is certified that error appears in the above-identified patent and that said Letters Patent is hereby corrected as shown below:

In the Claims:

In column 10, line 53, in Claim 6, delete "urce" and insert -- source --, therefor.

Signed and Sealed this
Twenty-third Day of August, 2016

Michelle K. Lee
*Director of the United States Patent and Trademark Office*